United States Patent [19]

Bauer et al.

[11] Patent Number: 4,991,271
[45] Date of Patent: Feb. 12, 1991

[54] ANCHORAGE DEVICE

[75] Inventors: David J. Bauer, West Bloomfield; Anthony J. DiSalvo, Allen Park, both of Mich.

[73] Assignee: Tip Engineering Group, Inc., Farmington Hills, Mich.

[21] Appl. No.: 449,504

[22] Filed: Dec. 1, 1989

Related U.S. Application Data

[63] Continuation of Ser. No. 170,994, Mar. 21, 1988, abandoned.

[51] Int. Cl.$^5$ ............................................. F16B 21/02
[52] U.S. Cl. ........................................ 24/590; 24/686; 296/100; 410/101
[58] Field of Search ............... 411/84, 85, 349, 553, 411/549, 550, 551, 552; 296/43, 100; 114/75; 410/101, 109, 112, 113, 106, 116; 248/500, 503; 24/115 K, 590–596, 686, 683, 682, 287, 265 CD

[56] References Cited

U.S. PATENT DOCUMENTS

| | | | |
|---|---|---|---|
| 3,142,264 | 7/1964 | DeBoer | 410/106 |
| 3,351,356 | 11/1967 | Clark et al. | 410/116 X |
| 3,556,457 | 1/1971 | Patnaude | 410/101 X |
| 4,219,229 | 8/1980 | Ciocan | 410/101 X |
| 4,442,571 | 4/1984 | Davis et al. | 24/596 X |
| 4,467,987 | 8/1984 | Small | 411/549 X |

Primary Examiner—James R. Brittain
Attorney, Agent, or Firm—John R. Benefiel

[57] ABSTRACT

An anchorage device including a molded anchor base piece received in an oblong hole punched into an automotive body panel and secured by mating of grooves formed in the periphery of a plug portion of the anchor base piece adjacent a flange portion positioned against the body panel portions adjacent the hole. The complementarily shaped plug portion is inserted into the hole with a seal compressed beneath the flange, and rotated to cause the edges of the body panel to enter the locking grooves, forming a fluid tight seal to the body panel. The base is formed with a keying bore or other anchoring feature to which a mating fitting may be readily secured.

2 Claims, 2 Drawing Sheets

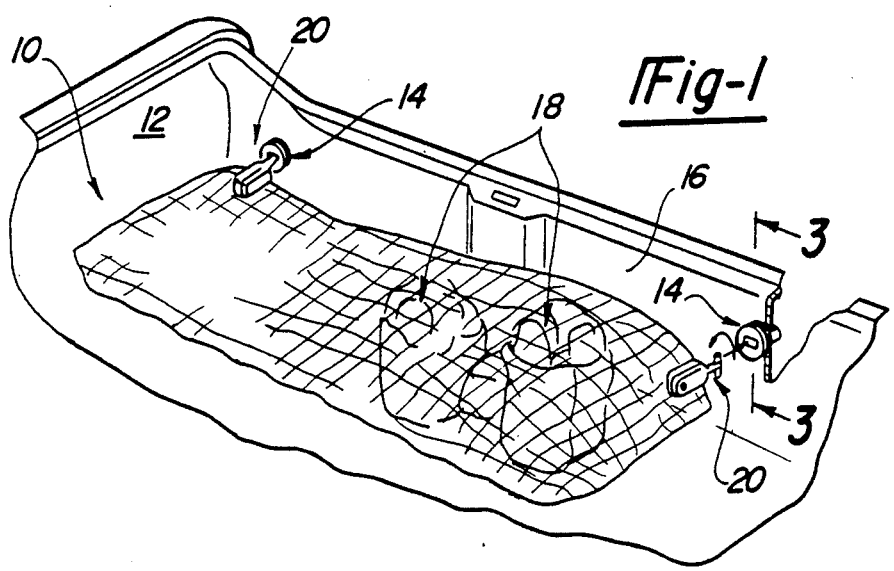
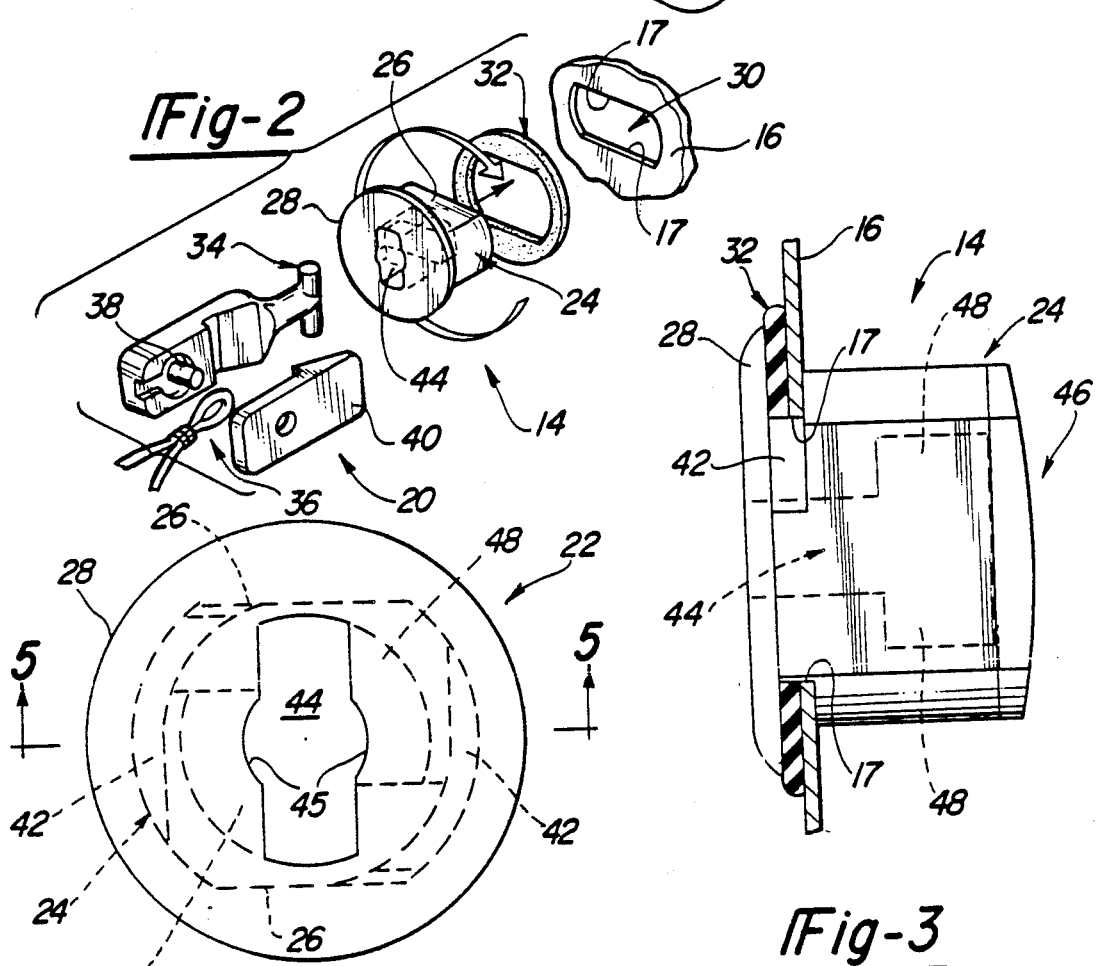

4,991,271

ANCHORAGE DEVICE

This application is a continuation of application Ser. No. 07/170,994, filed 03-21-88, abandoned.

BACKGROUND OF THE INVENTION

The present invention concerns anchoring fittings and more particularly anchorage for the surface of automotive body panels.

It is sometimes necessary to provide a sturdy retention for accessory items used in the interior spaces of automobiles. For example, cargo hold down nets and straps have heretofore been employed in the trunks of sedans and the cargo spaces of station wagons and light trucks.

Such equipment requires a secure attachment such that anchoring to body sheet metal portions is required for adequate strength.

Providing a suitable anchorage at minimum cost while affording adequate strength has presented difficulties, particularly since such equipment is typically offered as an option, and not installed in all of the cars produced of a given model.

One approach has been to secure a hat shaped bracket to the sheet metal, as by screws or welding, and bolting a hook or eye to the bridging portion thereof. This entails a good deal of assembly labor and inventory of several parts. Furthermore the result is a structure which projects sharply into the interior space of the auto.

Such anchorage must be both water and gas tight to prevent the entrance of these fluids into the interior spaces of the auto in which the anchorage is installed. Furthermore, such anchorages should preferably be able to be completely installed entirely from the inside of such spaces to minimize the assembly labor required, or to make installation possible where there is only access to the interior side of the panel.

Accordingly, it is an object of the present invention to provide an anchorage for body panels suitable for automotive installations, which is simple and able to be installed entirely from the inside surface with a minimum of labor, with a resulting completely water and gas tight connection.

It is a further object to provide an anchorage which is adaptable to optional installation, and projects only minimally from the inside surfaces.

SUMMARY OF THE INVENTION

These and other objects of the present invention as will be understood from a reading of the following specification and claims are achieved by an anchor base piece having a generally oblong shaped plug portion. The anchor base piece when aligned is able to be received through a correspondly shaped hole formed in the panel to which the anchorage is secured. The anchor base piece is formed with a flange portion on the inside end of the plug portion, adapted to compress an interposed seal received around the anchor base piece against the inside surface of the panel. A pair of circumferential locking grooves are recessed into the anchor base piece plug portion adjacent the flange and of a width able to receive the edge of the panel as the anchor base piece is rotated out of alignment with the oblong hole with the seal compressed beneath the flange portion.

The anchor base piece is formed with an anchoring feature able to be mated with a retention element of the item to be anchored. In a first embodiment, the anchoring feature comprises a keying bore extending into the inside end of the anchor base piece with a slotted entrance to receive a tee shaped retention element, and the keying bore having arcuate undercut recesses each receiving an end of the tee shape upon being rotated out of alignment with the slotted entrance.

In other embodiments, a hook is formed on the anchor base piece, comprising the anchoring feature, in one version projectly into the space above the anchor base piece, in another version, entirely recessed within a bore formed in the anchor base piece to maximize the flush mounting quality thereof.

The present invention has the advantage of being able to be easily installed from the inside of the vehicle space and produces a water and gas tight seal. Comprised of only two simple components, the base piece and seal, the cost of providing the anchorage is much less than conventional installations and only minimally projects into the vehicle interior space.

DESCRIPTION OF THE DRAWINGS

FIG. 1 is a fragmentary perspective view of the interior trunk space of an automobile, with a cargo holding net installed with the use of anchorage devices according to the present invention.

FIG. 2 is an exploded perspective view of the components of the anchorage device according to the present invention, together with cargo net retention element and adjacent body panel structure.

FIG. 3 is a view of the section 3—3 taken in FIG. 1 through an installed anchorage device according to the present invention.

FIG. 4 is an end view of the anchor base piece included as a part of the present invention.

DETAILED DESCRIPTION

Figure 5:
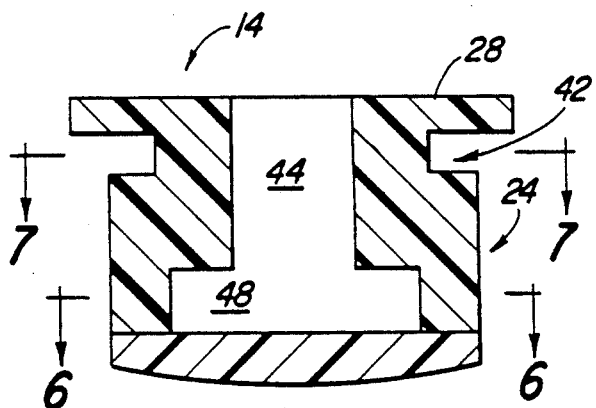
FIG. 5 is a view of the section 5—5 taken through the anchor base piece in FIG. 4.
Figure 6:
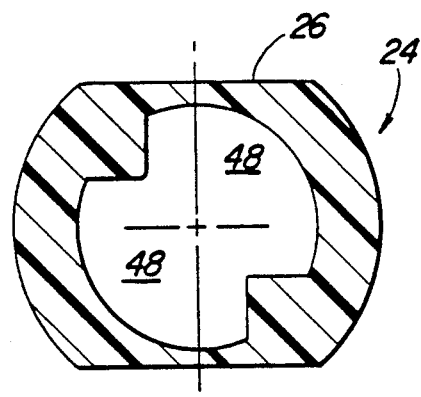
FIG. 6 is a view of the section 6—6 taken across the anchor base piece in FIG. 5.
Figure 7:
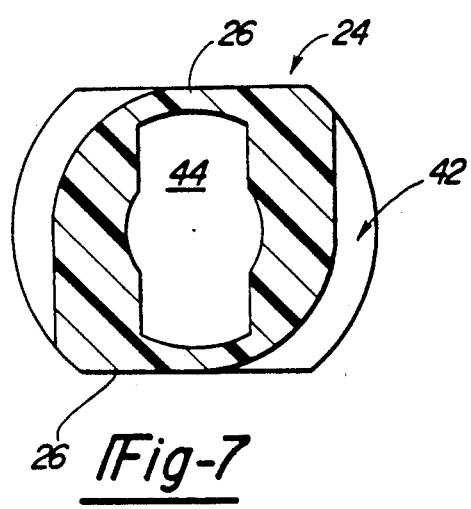
FIG. 7 is a view of the section 7—7 taken across the anchor base piece in FIG. 5.

In the following detailed description, certain specific terminology will be employed for the sake of clarity and a particular embodiment described in accordance with the requirement of 35 USC 112, but it is to be understood that the same is not intended to be limiting and should not be so construed inasmuch as the invention is capable of taking many forms and variations within the scope of the appended claims.

Referring to the drawings, FIG. 1 illustrates the installation of a cargo net 10 in the interior space 12 of an automobile trunk utilizing a plurality of anchorages 14. Auto body sheet metal portions 16 define in part the trunk space 12. While two anchorages 14 are shown it should be understood that typically an additional two floor mounted anchorages would also be employed.

The cargo net 10 is of a well known design adapted to restrain stored items such as grocery bags 18, and includes retention elements 20 adapted to be releasably secured to the anchorages 14.

The anchorages 14 are comprised of an anchor base piece 22 having a generally cylindrical but oblong plug portion 22 with flattened sides 24 and a flange portion 28 formed on the inside end thereof. A generally cylindrical but oblong hole 30 is formed into the body metal portion 16 correspondingly shaped to fit the plug portion 24 when oriented to be aligned therewith.

A compressible gasket or seal 32 is interposed beneath the flange portion 28 and the sheet metal body portion 16, compressible upon installation of the anchor base piece 14 to establish a fluid tight seal and to frictionally lock the anchor base piece 14 in the installed position.

The retention element 20 includes a tee shaped locking piece 34 adapted to be secured to a cord loop 36 of the cargo net 10 over a post 38, retained by a cover piece 40.

The anchor base piece 14 is locked to the body panel portion 16 by means of an oppositely located pair of circumferential grooves 42 recessed into the plug portion 24 immediately adjacent the flange portion 28. Grooves 42 spiral from a point of tangency to the flat sides 26 to relieve the main diameter of the plug portion 24. Thus, the anchor base piece 14, after being inserted in a hole 30, and compressing the seal 32 sufficiently to bring the body portion 16 into axial registry with the grooves 42, is rotated 90° clockwise causing the edges 17 of the body portion 16 defining the flats of hole 30 to enter the grooves 42. This produces a locking of the anchor base piece 14 to the body portion 16, the friction generated by compression of the seal 32 serving to retain the same in the rotated locked position. As shown in FIG. 3, the grooves 42 are of greater width than the thickness of the body panel 16 so that one side of grooves 42 is spaced sufficiently far from the flange portion 28 to accommodate the seal 32 when compressed beneath the flange portion 28.

The anchor base piece 14 is also formed with a generally slotted keying bore 44, adapted to receive the tee portion 34 of a retention element 20 with slight radiuses 45 provide to accommodate the ends of tee portion 34.

The keying bore 44 extends axially to terminate at an end top secured to the end of the anchor base piece 24. At the rear of the keying bore 44, there are also provided arcuate recesses 48 configured to receive the ends of the tee portion 34 as it is rotated clockwise after being fully inserted in the slot 44. This enables a readily releasible securement of the retention element 20 therein to provide a convenient and secure anchorage for the cargo net 10.

The direction in which recesses 48 extend is the same as grooves 42 so that rotation of the retention element 20 tends to tighten the securement of the anchor base piece 14. A tee shaped tool may be employed as an aid to the original assembly of the anchor base piece 14.

The resultant anchorage may be installed at minimum cost by auto manufacturers, the hole 30 formed at almost no cost by being punched therein at the time of forming of the body panel portion 16.

The anchor base piece 14 can be installed entirely from inside the body space, a decided advantage if double walls make exterior access impossible, and reducing assembly labor in any situation.

The anchorage prevents a substantially flush inside configuration and may optionally be replaced with a sealing dummy plug (not shown) for autos not to be supplied with the cargo net 10 or other item required to be anchored.

Figure 8:
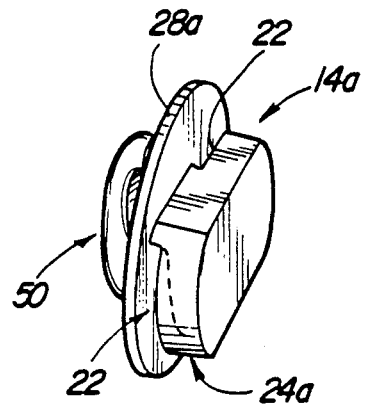
FIG. 8 is a perspective view of an alternate embodiment of anchor base piece according to the present invention.
Figure 9:
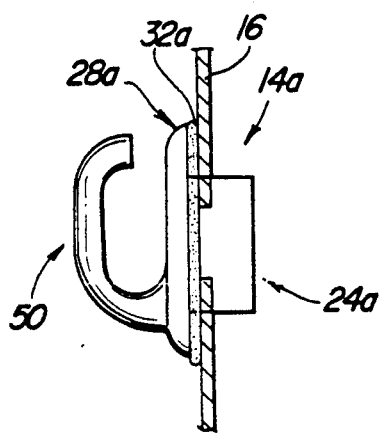
FIG. 9 is a sectional view taken through an installed anchorage using the base piece shown in FIG. 8.

FIGS. 8 and 9 illustrate a simpler version of the anchorage according to the present invention, in which a molded hook 50 is provided protruding from the flange 28a of the anchor base piece 14a. The plug portion 24a is of shorter axial dimension since the bore 44 is not necessary. The hook 50 may be employed to rotate anchor base piece 14 in mounting the same to body portion 16, with an interposed seal 32a used as before.

In this embodiment the loop 36 may be directly passed onto the hook 50 to secure the cargo net 10.

Figure 10:
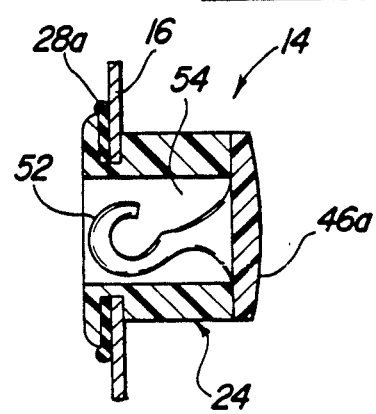
FIG. 10 is a sectional view taken through an installed anchorage using another embodiment of the base piece.

FIG. 10 illustrates a recessed version of the embodiment of FIGS. 8 and 9, where a hook 52 is integrally molded in end cap 46a, hook 52 recessed in a bore 54 of anchor piece 24a.

This restores the low profile of the first embodiment while eliminating the need for a separate retention element.

The anchor base piece 14 is preferably molded of a high strength plastic such as nylon, which also absorbs moisture and expands, to tighten the seal in wet conditions.

We claim:

1. An anchorage for providing a securement feature for an internal space of an automobile body defined in part by a body panel, comprising:

an anchor base piece having a solid plug portion and a radially outward extending flange portion formed on one end thereof, said plug portion being oblong shaped in section with flattened sides on either side thereof;

an hole formed in a portion of said body panel defining in part said body internal space, said hole being shaped to be fit to receive said plug portion with said plug rotated into alignment therewith;

a compressible seal received about said plug portion and interposed between said flange portion and said body panel portion said flange portion being sufficiently stiff to be able to substantially compress said seal against said body panel portion;

a pair of circumferentially extending grooves formed into the periphery of said plug portion adjacent said flange portion, extending tangentially from either flattened side to accommodate limited rotation of said plug portion in said hole by the edge of said hole being received thereinto to secure said anchor base piece to said body panel portion, each of said pair of grooves being of greater axial width than the thickness of said body panel portion but substantially less than the combined thickness of said panel and said uncompressed seal;

an anchoring feature formed on said anchor base piece enabling securement of an item thereto, said anchoring feature comprises a keying bore formed in said anchor base piece, comprised of a blade shaped entrance portion extending axially inward from the flange portion and arcuate recesses formed axially inwardly from said entrance portion and extending radially from said entrance portion, said keying bore adapted to receive a tee shaped piece having ends able to be rotated into said recesses to be anchored thereto.

2. The anchorage according to claim 1 wherein said arcuate recesses extend radially from said entrance portion of said keying bore in the same direction as said grooves extend from said flattened sides.

* * * * *